Dec. 18, 1951     H. E. ROSE     2,579,051
UNLOADER VALVE
Filed Sept. 29, 1943     3 Sheets-Sheet 1
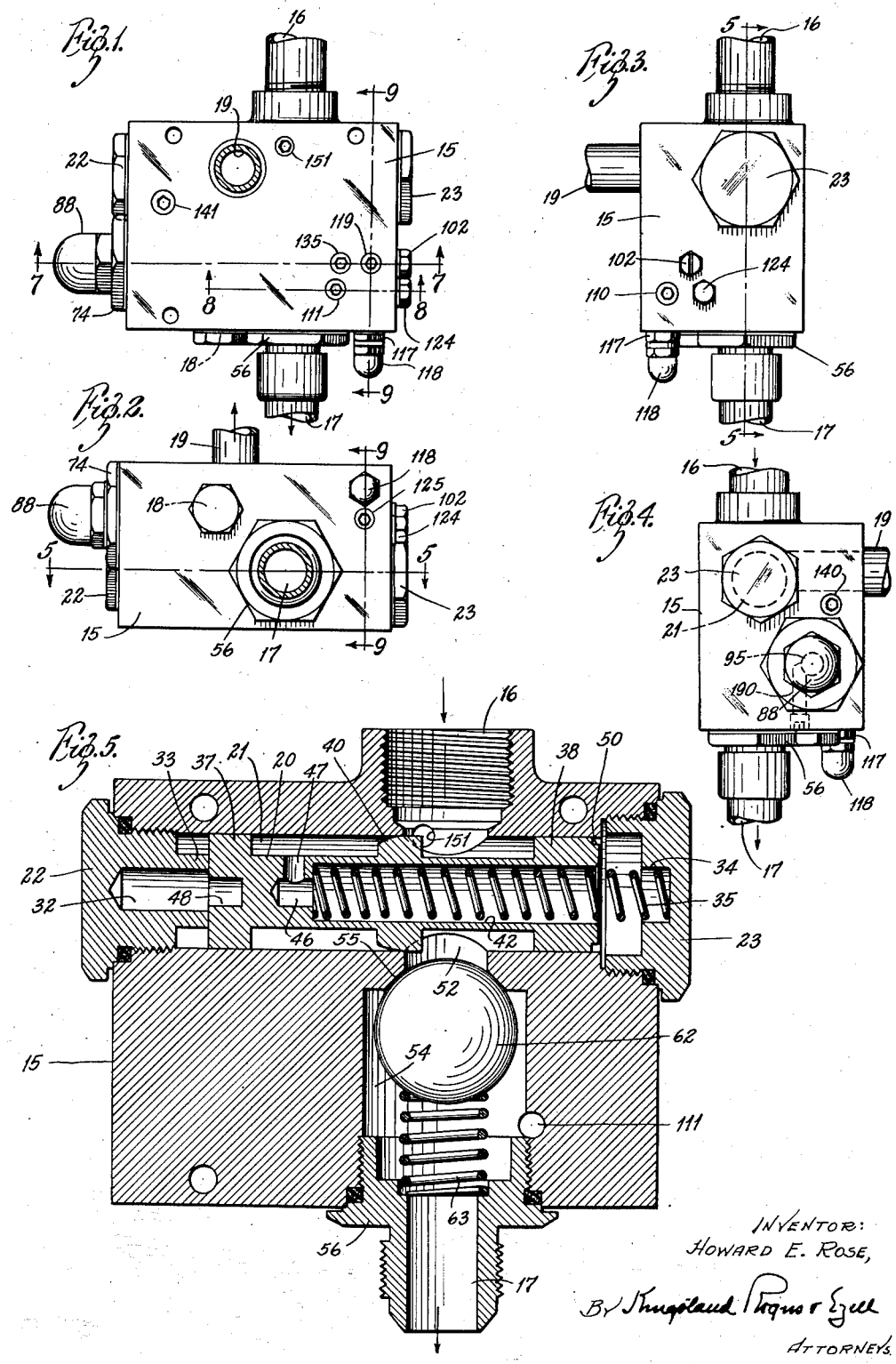

Dec. 18, 1951   H. E. ROSE   2,579,051
UNLOADER VALVE
Filed Sept. 29, 1943   3 Sheets-Sheet 2

INVENTOR:
HOWARD E. ROSE,
ATTORNEYS.

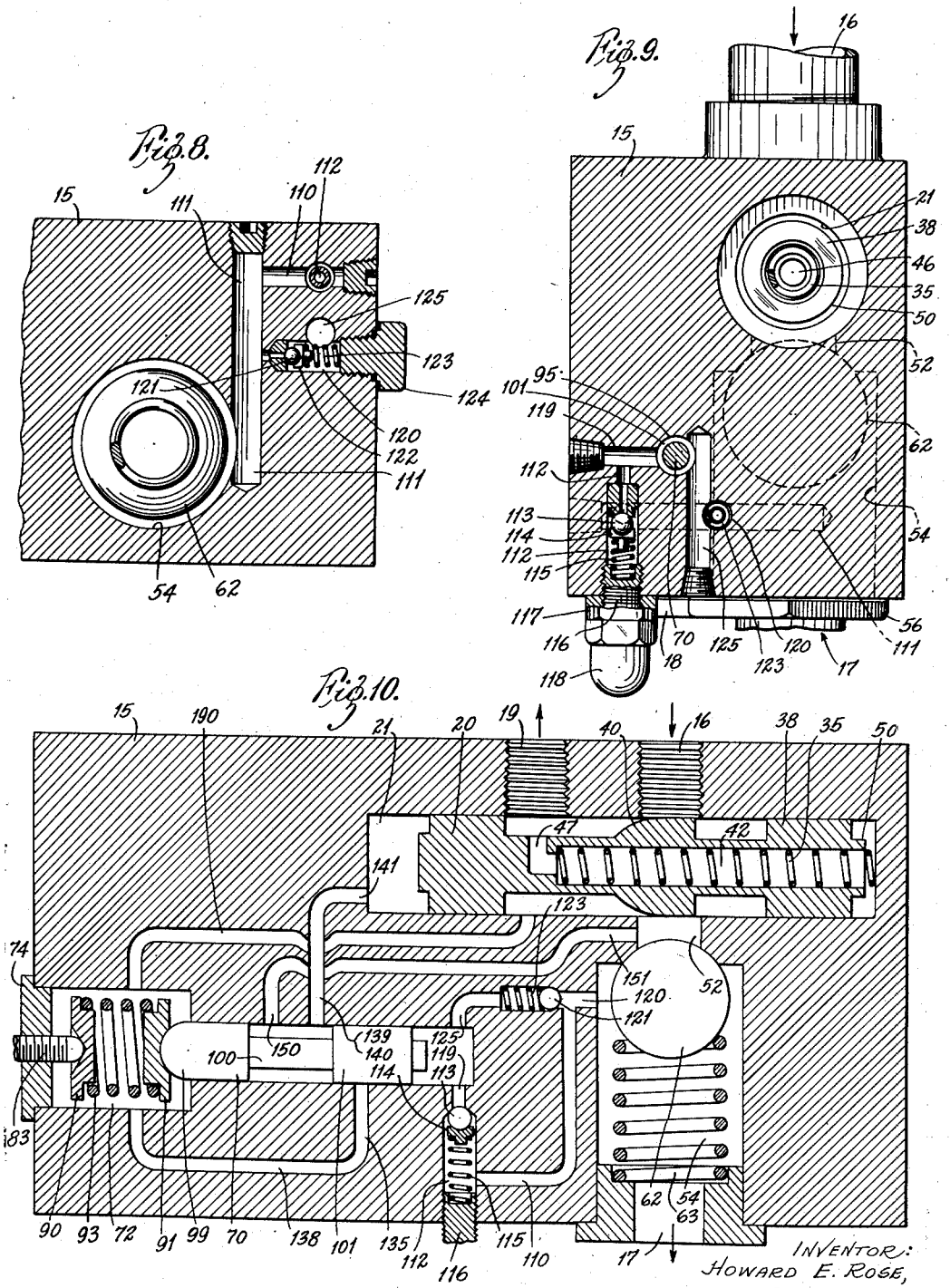

Patented Dec. 18, 1951

2,579,051

UNITED STATES PATENT OFFICE 2,579,051

UNLOADER VALVE

Howard E. Rose, Normandy, Mo., assignor to Alco Valve Company, University City, Mo., a corporation of Missouri Application September 29, 1943, Serial No. 504,213

10 Claims. (Cl. 137—153)

This invention relates to an unloader valve to be used for maintaining pressure in an accumulator line between certain maximum and minimum pressures.

More particularly, it relates to such a valve to be used in conjunction with certain other control valves, including a differential pressure control valve, by means of which pressure in an accumulator line of a braking system of an airplane, or some other system of control of an airplane, is kept within certain prescribed limits of maximum and minimum pressures.

An object of the invention is to provide a valve operable in response to a predetermined relatively high pressure, to cut off flow through a given line, and in response to a relatively lower pressure, to reestablish flow.

A further object is to provide a main valve, controlling flow in a pressure line, and a pilot valve to effect operation of the main valve, with pressure-responsive means subjected to pressure in said line to effect operation of the pilot valve to establish flow through the main valve when the pressure in the line is below one value, and to effect operation of the pilot valve to stop flow after the line pressure attains a predetermined higher value.

A further object is to provide an unloading or dumping valve that will automatically maintain a desired working line pressure, and will, upon attainment thereof, automatically maintain a desired pressure in the inlet line.

A further object is to provide an unloading valve that will produce an adjustable maximum working pressure, and will prevent fall of working pressure by more than an adjustable predetermined amount below maximum pressure.

A further object is to provide a dumping valve that will maintain control of line pressure when in unloading position.

In the drawings:

Fig. 1 is a side elevation of the unloading valve and associated parts of the invention.

Fig. 2 is a bottom view of the valve.

Fig. 3 is an end elevation of the device, taken from the right of Fig. 1.

Fig. 4 is an elevation taken from the left of Fig. 1.

Fig. 5 is a vertical section on the line 5—5 of Fig. 2.

Fig. 8 is a section on the line 8—8 of Fig. 1.

Fig. 9 is a section on the line 9—9 of Figs. 1 and 2.

Fig. 10 is a diagrammatic view of the valve, to show the connections.

Figure 6:
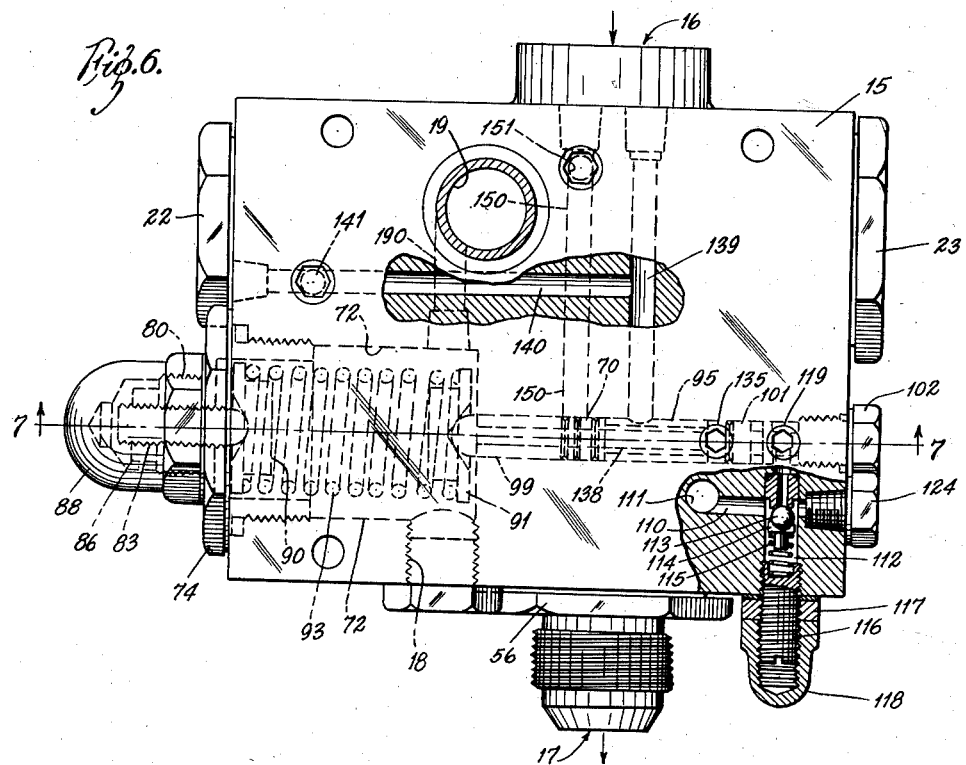
Fig. 6 is an elevation, partly in section, similar to Fig. 1.

In the drawings, particularly Figs. 1 through 4, is shown a substantially box-shaped housing 15 for the device. In the housing 15 are an entrance port 16, and exit ports 17, 18, and 19.

The internal parts of the mechanism are shown in Figs. 5–9. An unloading or a dumping valve 20 functions in a bore 21 extending lengthwise through housing 15 between two sealing plugs 22 and 23 screwed into the ends of the housing 15. The heads of the plugs are shaped to adapt them to tightening or loosening by means of a wrench. The center of plug 22 is bored from the inside to the head, as indicated at 32, and the inner end of plug 21 is reduced in radius to form the annular lip 33. The plug 23 is centrally bored at 34 for the reception of the end of a coil spring 35. From the inner end to 34 plug 23 has a somewhat larger bore than the bore 21 of valve 20.

The valve member 20 slides in the bore 21 on two cylindrical end portions 37 and 38. A valve closure member 40 is a tapering section having a greater diameter, of a size to effect a cut off in the bore 21, on the end facing plug 23 with decreasing diameter toward the end facing plug 22, for a reason which will become obvious later. A large bore 42 in the center of valve member 20 extends from approximately midway between member 37 and member 40 to the right end of the member 20. Within this bore 42, between its left end and the recess in plug 23, is the coil spring 35. At the left end of the bore 42 is a bore 46 of reduced diameter. Extending upwardly from bore 46 to the surface of member 20 is another bore 47. The bore 47 opens through at a point a substantial distance from the plug 40, for a purpose to be described. In the left end of the member 20 is another small bore 48. The extreme right end 50 of member 20 is slightly reduced in diameter.

Adjacent the bore 21 and opening into it through a passage 52 is a ball check valve chamber 54. The seat of the valve consists of a spherically concave annular recess 55 in the housing 15 adjacent to the passage 52. At the other end of the valve is a centrally bored plug 56 screwed and sealed into the housing 15, as indicated. The plug, as shown, has threads. The movable parts of the valve consist of a ball 62 and a coil spring 63 extending between the ball 62 and a spring holding recess formed by the reduction in the diameter of the bore of the plug 56.

Figure 7:
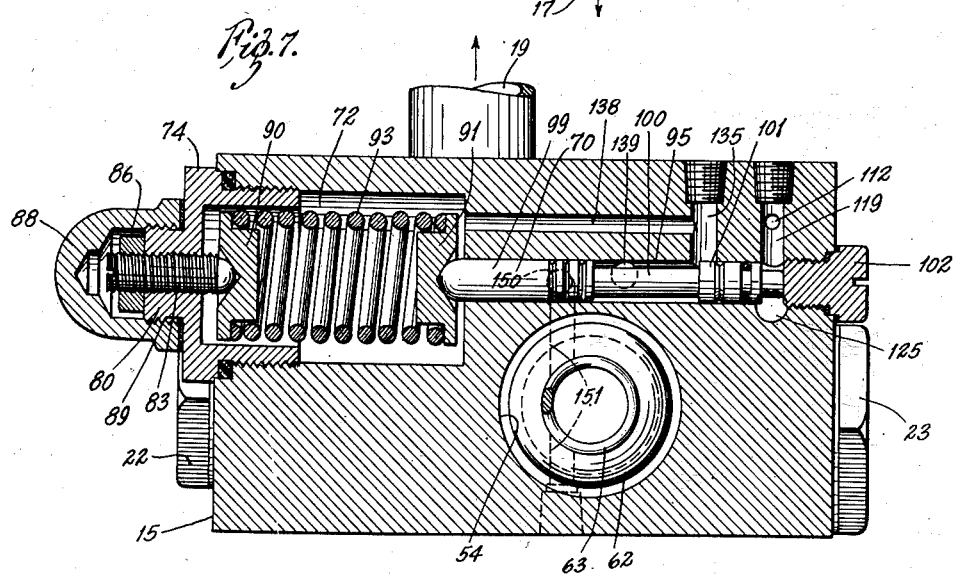
Fig. 7 is a horizontal section on the line 7—7 of Fig. 1.

The third principal valve, a pilot valve 70, is best shown in Fig. 7. This valve is contained within two cylindrical chambers meeting within the housing 15 and extending respectively to the ends of that housing. The larger of these chambers, 72, is closed by a valve adjustment plug 74 screwed and sealed into the chamber 72 as indicated. The plug 74 has a reduced exteriorly threaded portion 80. The plug 74 is centrally bored and internally threaded to receive an adjustment bolt 83, the exterior end of which has a kerf for the reception of a screw driver. A nut 86 is adapted to be screwed on to the bolt 83 to set the same after proper adjustment is made. A cap 88, having interior threads 89 to engage threads of the plug, is adapted to be screwed on to the end of the plug 74.

Within the chamber 72, and between a spring retainer 90 abutting adjustment bolt 83, and a spring retainer 91 facing the inner end of the chamber, is a coil spring 93.

Slidably mounted within a smaller chamber 95 that opens into the chamber 72, and projecting therefrom to engage the spring retainer 91, is the valve 70. The valve stem 70 has a first head 99, a portion 100 of reduced diameter, and a second valve head 101. The two heads fit closely within the chamber 95 and seal off the space formed by the reduced portion 100. The end of the chamber 95 is closed by a screw plug 102. The head of plug 102 is a hexagon so that the plug 102 can be tightened or removed by a screw driver.

In Fig. 8 is shown a passage 110, drilled from the right end of the housing 15. The outer end of the passage is plugged as shown. From the front of the housing, intersecting 110 and extending backward to cut into the side of the chamber 54 below the ball valve 62, is drilled a passage 111. The outer end of this passage is also plugged as shown.

The passage 110 also registers with a passage 112, drilled from the bottom of the housing 15 (see also Fig. 9). In this passage 112 is an adjustable differential pressure valve comprised of a ball valve 113, a retainer 114, a spring 115, a screw 116, a lock nut 117, and a cap 118. A cross passage 119, plugged on the outside, extends from the front of the housing 15 to connect the passage 112 with the valve passage 95.

From the right side of the housing 15 to the passage 111 is drilled a check valve receiving bore 120, accommodating a spring ball valve comprised of a check valve 121, a retainer 122, a spring 123, and a plug 124. The passage 120 registers with a vertical passage 125 which extends from the bottom of the housing 15 to cut into the side of the pilot valve chamber 95. Both passages 120 and 125 are plugged at the outside.

Also from the front of the housing 15 and to the left of the passage 119, a passage 135 (Fig. 7) is drilled to meet the pilot valve chamber 95. The passage 135 is plugged at the outside. A passage 138 connects the large chamber 72 of the pilot valve and the passage 135.

From the pump side to the pilot valve chamber 95 is drilled a passage 139 (Figs. 6 and 7), plugged at the outside. The passage 139 is connected by means of a passage 140, drilled from the left end of the housing 15, with a hole 141, drilled from the front to the actuating chamber of the dumping valve chamber 21. The hole 141 leads into the chamber 21 at the annular space provided by the flange 33 on the plug 22.

A passage 150, drilled from the top of the housing 15, connects the chamber 95 of the pilot valve with a port 151 leading into inlet 16. (See Figs. 6 and 5.) A passage 190 (Fig. 6), plugged at the outside, is drilled from the side to the chamber 72 and the reservoir outlet 19. The passage 190 also registers with the outlet 18, which is normally plugged. When the plug is removed, the exhaust to relieve the valve does not pass into the reservoir line, but flows through the outlet 18.

*Operation*

The operation may be best understood by considering Fig. 10, wherein the parts are shown diagrammatically with their several connections.

The spring 93 of the pilot valve 70 is set to permit the pilot valve to yield to the left at a selected pressure, such as 1500 p. s. i., while the spring 115 of the differential pressure control valve 113 is set to yield to open the valve at a lower pressure such as 300 p. s. i., but as this valve has back of it the pressure of the accumulator, the differential pressure valve will open, not at 300 p. s. i., but at 300 p. s. i., plus the accumulator pressure. Thus, if the accumulator pressure is 1500 p. s. i., the valve 121 would open to admit pressure to the pilot valve, but the differential pressure valve 113 would not open to allow pressure to escape from the pilot valve to the accumulator until accumulator pressure had fallen to less than 1200 p. s. i., when the pressure within the actuating chamber of the pilot valve is at 1500 p. s. i.

Assuming that at the start the main valve 20 is in the unloading position, the disposition of the several parts will be as shown in Fig. 10. The valve 20 will be to the right. The pressure in the accumulator line 17 and the chamber 54 will be assumed to be between maximum pressure and minimum pressure, which two pressures are, as will be explained, determined by the main spring 93 acting on the pilot valve 70, and the forces acting on differential pressure valve 113. The pilot valve 70 will be to the left with the spring 93 compressed. The check valve 121 will be closed. The differential valve 113 will be closed. Fluid at maximum pressure will occupy the actuating chamber to the right of the pilot valve 70. The check valve 62 will be closed.

In this situation, pump pressure will flow into the inlet 16. It will be seen that the enlargement 40 does not completely cut off communication between the inlet 16 and the passage 52 immediately above the ball valve 62. Consequently, pump pressure will exist within the chamber 52. The flow of liquid from the inlet 16 or the chamber 52 to the reservoir outlet 19 is controlled by the position of the tapered portion 40 on the main valve 20. This tapered portion provides an annular space or orifice through which the fluid may flow from the inlet to the reservoir outlet. The size of this annular orifice is determined by the position of the element 40 relative to the inlet 16. The size of the orifice determines a reduction in pressure between the inlet 16 and the outlet 19, the chamber 52 being at a higher pressure and substantially equal to that of the inlet 16. There is accordingly a pressure drop from the inlet to the outlet and this pressure drop is used to control the position of the valve 20.

It will be seen that with the pilot valve 70 in the position of Fig. 10, the ports 151 and 150 communicate through the reduced portion 100 of the pilot valve 70 with the ports 139, 140 and 141 leading to the left end of the cylinder 21 to act upon the left end of the valve 20. The pressure in these ports is, therefore, the pump pressure. The pressure acting in opposition to pump pressure on the valve 20 is a combination of the pressure of the spring 35 plus reservoir pressure, the latter being admitted to the right end of the valve 20 through the port 47 and the spring chamber 42 of the valve.

It will be seen that at the time the valve 20 is to move from left to right, because the accumulator pressure had attained its maximum value, the pump pressure will be at its maximum value and the pressure in the line 151 will be at that value. The pilot valve 70 necessarily changes position before the main valve does, so that at the moment the pilot valve assumes the position shown in Fig. 10 maximum pressure will be introduced into the left end of the cylinder 21 to force the main valve 20 all the way to the right. This movement, however, relieves the pump pressure by exhausting it into the reservoir line 19 until it attains a much lower value. Hence, the pressure acting upon the left end of the main valve 20 reduces sharply until it may become lower than the combined pressure of the spring 35 and the reservoir pressure acting upon the right end of the valve 20. Thereupon, the valve 20 will move somewhat toward the left. In so doing the portion 40 will begin to constrict the orifice from the inlet 16 to reduce the pressure in the reservoir 19 and thereby to reduce the pressure tending to move the main valve to the left. The parts are so designed that when this movement produces a predetermined pressure drop, the valve 20 will stop its movement. Since the reservoir pressure does not normally vary, the pressure drop for a particular position of the valve 20 actually provides a particular pressure in the pump line, depending, of course, upon the pump volume. Any increase or decrease in this pump line pressure will upset the balance of the valve 20 which will move to restore the desired pump line pressure.

It will be seen that the foregoing balancing movements of the main valve 20 are independent of the accumulator pressure back of the check valve 62, and take place without any change in the position of the pilot valve 70.

When the accumulator pressure falls, it relieves the pilot valve 70. It will be seen that the pressures acting upon the different check valve 113 comprise pilot valve actuating chamber pressure opposed by accumulator pressure and the pressure of the spring 115. The actuating chamber pressure is determined by the spring 93 which constantly maintains force against the fluid within in the actuating chamber of the pilot valve. Since the spring 93 does not yield until the desired maximum accumulator pressure has been delivered to the actuating chamber of the pilot valve 70, and since the valves 113 and 121 are held closed, this latter pressure remains at maximum accumulator pressure value during drop of actual accumulator pressure.

When the back force acting to seat the differential check valve 113 falls to below maximum accumulator pressure within the actuating chamber, the check valve 113 opens. This back force comprises actual accumulator pressure plus the force of the spring 115, so that accumulator pressure must drop down to a value below maximum pressure less the force of the spring 115. The latter has here been assumed to be 300 p. s. i., as against a maximum accumulator pressure of 1500 p. s. i.

Therefore, the pilot valve 70 will be maintained to the left until actual accumulator pressure falls to below 1200 p. s. i. When it does so fall, the valve 113 will be shifted to open position to relieve the pressure holding the valve 70 against the spring 93 and the valve 70 will be moved to the right. In this operation the spring 93 maintains a constant pressure ejecting the fluid from the actuating chamber so that the valve moves rapidly.

When the pilot valve 70 thus moves to the right it cuts off the ports 150 and 151 from the port 139 and opens the port 135 to the port 139. Thereupon, the left hand actuating chamber of the main valve 20 is exhausted to the reservoir line 19 through the ports 141, 140, 139, 135, 138, 72 and 190. The last port, 190, is always open to the reservoir line to prevent the building up of any pressure opposing the leftward displacement of the pilot valve 70.

When the left hand pressure on the main valve 20 is reduced toward reservoir pressure, the spring 35 moves the main valve 20 to the left. In so doing, the portion 49 will seal within the cylinder 21 to cut off the reservoir outlet 19 from both the inlet and the chamber 52. Thereupon, pump pressure may build up against the exposed portion of the check valve 62. This valve is held closed by the combination of the spring 63 and the accumulator pressure. When pump pressure exceeds this closing pressure, the check valve 62 will open and pump pressure above the minimum pressure of the accumulator will then be supplied to the accumulator line to build the pressure therein up above minimum pressure.

At this time, the pressure within the actuating chamber of the pilot valve 70 is below the maximum accumulator pressure. Hence, increase of actual accumulator pressure, within the port 111, will act to open the check valve 121 and to oppose opening of the differential check valve 113. When the accumulator pressure and the pressure within the actuating chamber of the valve 70 equal maximum accumulator pressure for which the spring 93 is set, the valve 70 will shift to the left which, as before noted, will result in porting the left hand actuating chamber of the valve 20 to pump pressure and relieving pump pressure into the reservoir line. The check valve 62 will prevent reduction of accumulator pressure when this last action takes place.

It will be seen that the adjustment of the spring 93 determines maximum accumulator pressure. The manner of adjusting this spring is obvious from Fig. 7. The adjustment is accessible from the outside of the housing. Leakage of pressure through the adjusting mechanism is prevented by the sealing fit of the cap 88.

Adjustment of the spring 93 does not change the amount of differential obtained through the differential check valve 113. Thus, if the maximum accumulator pressure be raised from the assumed 1500 p. s. i. to 1700 p. s. i., the minimum accumulator pressure will change by the same amount. However, an adjustment of the spring 115 by the adjusting screw 116 (Fig. 6) can change the minimum pressure upwardly or downwardly as the case may be.

In Fig. 10, the port 151 is shown as entering the chamber 52. It may enter the inlet port 16, as shown in Fig. 5. In either case, it is subjected to a pressure that is a function of pump pressure rather than of reservoir pressure, so that it will always deliver the higher pressure to the left hand actuating chamber of the unloading valve 20.

In the foregoing description, parts of the valve have been referred to as front, top, bottom, right and left sides. These designations are merely for clarity of description as the valve is not limited to use in a particular position. Obviously, too, its range of operation is not limited to the particular values chosen, which are given solely for illustration.

In the claims:

1. In a mechanism of the kind described, a valve body having a high pressure inlet, a working outlet, and a low pressure outlet, a main valve adapted in a first position to cut off the inlet and the working outlet from the low pressure outlet, and movable toward a position to admit fluid flow from the inlet to the low pressure outlet, said valve having means to admit such flow in varying amounts determined by the amount of movement of the valve, whereby there may be a pressure drop from the inlet to the low pressure outlet during such flow, opposing pressure chambers to control movement of said valve, control means to admit fluid at said higher pressure to the first chamber to move the main valve toward establishing said flow from the inlet to the low pressure outlet, said second chamber being connected to the low pressure outlet, and means to apply a relatively fixed force to the valve to resist the force exerted by the pressure in the first chamber.

2. In a differential pressure control system, a pressure-supply line, a pressure-receiving line, an exhaust line, a pilot valve, and an unloading valve, an actuating chamber for the pilot valve, an actuating chamber for the unloading valve, said pressure-supply line opening into said pressure-receiving line, pressure-resisting means in said pressure-receiving line, said means being adapted to shut off the portion of said pressure-receiving line back of it from said exhaust line upon reduction of pressure of said pressure-supply line upon said pressure-resisting means, means for introducing fluid under pressure from said pressure-receiving line to the actuating chamber of said pilot valve to actuate the pilot valve upon the attainment of a predetermined pressure level in said pressure-receiving line, whereby said pilot valve is moved to one position, means whereby said pilot valve in said position is adapted to port fluid under pressure from said pressure-receiving line ahead of said pressure-resisting means to the actuating chamber of said unloading valve to move said unloading valve to one position, said unloading valve in said position providing substantially restricted passages between said pressure-supply line and said exhaust line, whereby fluid may pass to said exhaust line at pressure substantially less than the pressure of fluid in said pressure supply line, and fluid in said pressure-receiving line may be under pressure substantially greater than that in said exhaust line, the aforesaid communication with said pressure-supply and restricted communication with said exhaust line being adapted to hold pressure in said pressure-receiving line ahead of said pressure-resisting means above the level of pressure in said exhaust means, whereby fluid under pressure substantially lower than pressure of fluid ported to the actuating chamber of said unloading valve is ported to said exhaust line.

3. In a differential pressure control system, a pressure-supply line, a pressure-receiving line, an exhaust line, a pilot valve, and an unloading valve, an actuating chamber for the pilot valve, an actuating chamber for the unloading valve, said pressure-supply line opening into said pressure-receiving line, pressure-resisting means in said pressure-receiving line, said means being adapted to shut off the portion of said pressure-receiving line back of it from said exhaust line upon reduction of pressure of said pressure-supply line upon said pressure-resisting means, means for introducing fluid under pressure from said pressure-receiving line to the actuating chamber of said pilot valve to actuate the same upon the attainment of a predetermined pressure level in said pressure-receiving line, whereby said pilot valve is moved to one position, means whereby said pilot valve in said position is adapted to port fluid under pressure from said pressure-receiving line ahead of said pressure-resisting means to the actuating chamber of said unloading valve to move said unloading valve to one position, said unloading valve in said position providing substantially restricted passages between said pressure-supply line and said exhaust line and between said pressure-receiving line and said exhaust line, whereby fluid under pressure substantially less than the pressure of fluid in said pressure-supply line may pass to said exhaust line, and fluid in said pressure-receiving line may be under pressure less than that in said pressure-supply line.

4. In a mechanism of the kind described, a pressure-supply line, a pressure-receiving line, an exhaust line, and an unloading valve, said unloading valve having a mushroom element adapted in one position of the valve to shut the supply line and the pressure-receiving line from the exhaust line, but adapted in a second position of the valve to port fluid under pressure substantially less than pressure of fluid in the pressure-supply line from the pressure-supply line to the exhaust line and to supply fluid to the pressure-receiving line at a pressure substantially greater than that of the fluid ported to the exhaust line, said unloading valve having two chambers, means adapted to port fluid under predetermined pressure from the pressure-receiving line to one of said chambers, and means adapted to transmit fluid under pressure from said exhaust line to the other of said chambers, whereby said unloading valve is moved from said first position to said second position.

5. In a mechanism of the kind described, a valve housing having a high pressure inlet, a working outlet and a low pressure outlet, a throttling valve movable from a first position cutting off communication between the inlet and the low pressure outlet to a throttling position establishing controlled communication between the same, and mechanism to position said valve to maintain a predetermined relationship of pressure drop between the inlet and the low pressure outlet when the valve is in throttling position.

6. In a mechanism of the kind described, a valve housing having a high pressure inlet, a working outlet and a low pressure outlet, a throttling valve movable from a first position cutting off communication between the inlet and the low pressure outlet to a throttling position establishing controlled communication between the same, mechanism to position said valve to maintain a predetermined relationship of pressure drop between the inlet and the low pressure outlet when the valve is in throttling position, and means operated by pressure conditions in the working outlet to effect movement of the valve between its first and throttling positions.

7. In a mechanism of the kind described, a valve housing having a high pressure inlet, a working outlet and a low pressure outlet, a throttling valve movable from a first position cutting off communication between the inlet and the low pressure outlet to a throttling position establishing controlled communication between the same, mechanism to position said valve to maintain a predetermined relationship of pressure drop between the inlet and the low pressure outlet when the valve is in throttling position, and means operated by existence of a first predetermined high pressure for causing movement of the valve from first to throttling position, and operated by existence of a predetermined lower pressure for causing return of the valve from throttling to first position.

8. In a mechanism of the kind described, a valve housing having a high pressure inlet, a working outlet and a low pressure outlet, a throttling valve movable from a first position cutting off communication between the inlet and the low pressure outlet to a throttling position establishing controlled communication between the same, mechanism to position said valve to maintain a predetermined relationship of pressure drop between the inlet and the low pressure outlet when the valve is in throttling position, and means comprising a pressure operated pilot valve for causing movement of the valve between its first and throttling positions, said pilot valve having first pressure means urging it to a first position, and pressure chamber means urging it to a second position, in opposition to the first pressure means, said pressure chamber means being connected to the working outlet, and valve means in said connection to admit pressure to the chamber to move the pilot valve when the working pressure attains a predetermined high value and to release said pressure only when the working pressure falls to a predetermined low pressure.

9. In a differential pressure control system, a pressure-supply line, a pressure-receiving line, an exhaust line, a pilot valve, and a dumping valve, an actuating chamber for the pilot valve, an actuating chamber for the dumping valve, said pressure-supply line opening into said pressure-receiving line, pressure-resisting means in said pressure-receiving line, said means being adapted to shut off the portion of said pressure-receiving line back of it from said exhaust line upon reduction of pressure of said pressure-supply line upon said pressure-resisting means, means for introducing fluid under pressure from said pressure-receiving line to the actuating chamber of said pilot valve to actuate the pilot valve upon the attainment of a predetermined pressure level in said pressure-receiving line, whereby said pilot valve is moved to one position, means whereby said pilot valve in said position is adapted to port fluid under pressure from said pressure-receiving line ahead of said pressure-resisting means to the actuating chamber of said dumping valve to move said dumping valve to one position, said dumping valve in said position providing substantially restricted passages between said pressure-supply line and said exhaust line and between said pressure-receiving line and said exhaust line, whereby fluid may pass to said exhaust line at pressure substantially less than the pressure of the fluid in said pressure-supply line, and fluid in said pressure-receiving line may be under pressure substantially greater than that in said exhaust line, the aforesaid communication with said pressure-supply and restricted communication with said exhaust line being adapted to hold pressure in said pressure-receiving line ahead of said pressure-resisting means above the level of pressure in said exhaust means, whereby fluid under pressure substantially lower than pressure of fluid ported to the actuating chamber of said dumping valve is ported to said exhaust line, a second actuating chamber for said dumping valve, connected to the exhaust line, and yieldable means cooperating with fluid pressure in said second chamber to urge the dumping valve in a direction opposed to movement produced by pressure in the first actuating chamber.

10. In an unloading valve, a valve housing having a high pressure inlet, a low pressure outlet, and a working port, an unloading valve movable from an unloading position wherein it connects the inlet and the outlet, to a working position wherein it disconnects the outlet from the inlet and working port, check valve means in the working port to check backflow from said port, fluid pressure-responsive means to position the unloading valve in unloading position, to maintain a predetermined pressure difference between the inlet and the outlet, and in working position, including a pressure chamber, means connecting the pressure chamber selectively to inlet pressure and outlet pressure, to position the valve in unloading and working positions respectively, and means operating the connecting means in response to pressure conditions in the working port, to maintain working port pressures within predetermined limits.

HOWARD E. ROSE.

REFERENCES CITED

The following references are of record in the file of this patent:

UNITED STATES PATENTS

| Number | Name | Date |
|---|---|---|
| 1,806,301 | LeValley | May 19, 1931 |
| 2,079,135 | Turner | May 4, 1937 |
| 2,193,248 | Ernst | Mar. 12, 1940 |
| 2,219,896 | Harrington | Oct. 29, 1940 |
| 2,250,389 | Miller | July 22, 1941 |
| 2,264,375 | Hill | Dec. 2, 1941 |
| 2,267,380 | Tyler | Dec. 23, 1941 |
| 2,316,445 | Marshall | Apr. 13, 1943 |
| 2,320,763 | Trautman | June 1, 1943 |
| 2,397,117 | Ashton | Mar. 26, 1946 |
| 2,404,102 | Schultz | July 16, 1946 |